T. H. JORDAN.
COVER FOR COOKING UTENSILS.
APPLICATION FILED JAN. 25, 1917.
1,222,212.
Patented Apr. 10, 1917.
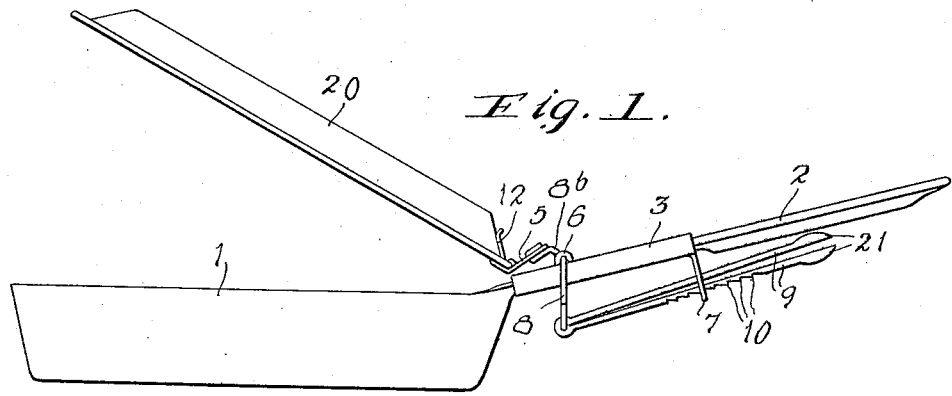
Fig. 1.
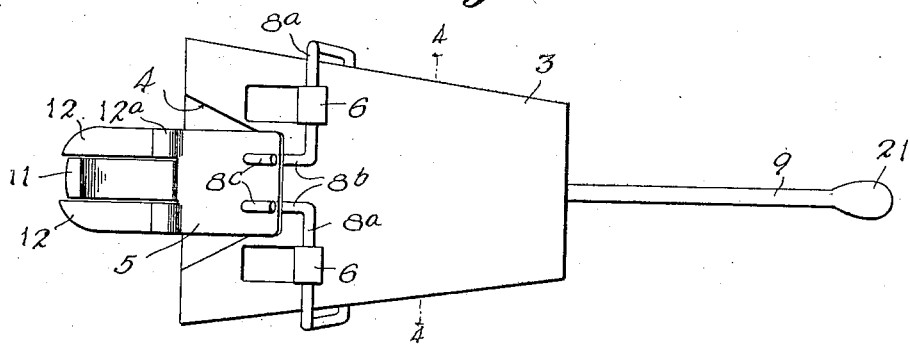
Fig. 2.
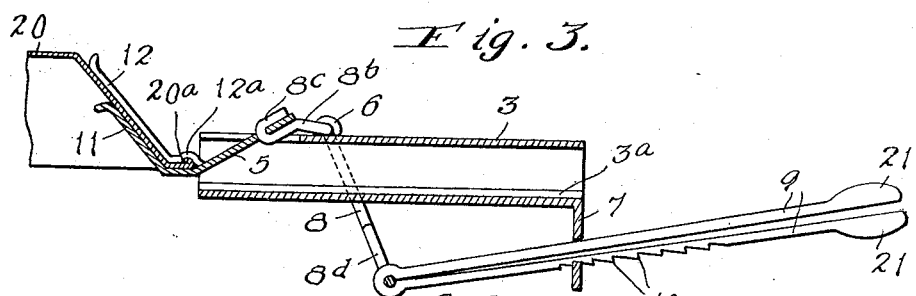
Fig. 3.
Fig. 4.
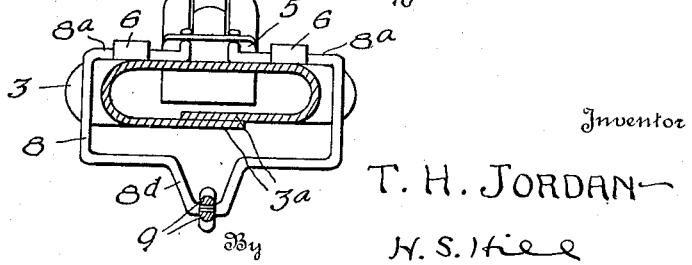
Inventor
T. H. JORDAN
By H. S. Hill
Attorney

United States Patent Office.

THOMAS H. JORDAN, OF MILTON, WEST VIRGINIA.

COVER FOR COOKING UTENSILS.

1,222,212.  Specification of Letters Patent.  Patented Apr. 10, 1917.

Application filed January 25, 1917. Serial No. 144,418.

*To all whom it may concern:*

Be it known that I, THOMAS H. JORDAN, a citizen of the United States, residing at Milton, in the county of Cabell, State of West Virginia, have invented a new and useful Cover for Cooking Utensils; and I do hereby declare the following to be a full, clear, and exact description of the invention, such as will enable others skilled in the art to which it appertains to make and use the same.

The present invention relates to a cover actuating mechanism for cooking utensils of that type, such as frying pans, which are provided at the upper edges thereof with laterally extending handles, and has for its object to provide a device of this character which embodies novel features of construction whereby the cover can be readily swung upwardly into an open position at any time without danger of burning the fingers.

Further objects of the invention are to provide a cover operating attachment of this character which is comparatively simple and inexpensive in its construction, which can be readily applied to an ordinary frying pan, which can be easily manipulated, and which admits of the cover being removed so that both the cover and the frying pan can be thoroughly cleansed without difficulty.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a frying pan provided with cover operating mechanism constructed in accordance with the invention, the cover being shown as swung upwardly into a partially open position.

Fig. 2 is an enlarged top plan view of the cover operating mechanism, showing the same as detached from the frying pan.

Fig. 3 is a longitudinal sectional view through the cover operating mechanism, a portion of the cover being shown.

Fig. 4 is a transverse sectional view on the line 4—4 of Fig. 2, looking in the direction of the arrows.

Corresponding and like parts are referred to in the following description and indicated in all the views of the drawings by the same reference characters.

For the purpose of illustration the attachment is shown as applied to a conventional frying pan which includes the body 1 and handle 2. A flattened and flared sleeve 3 is designed to be slipped upon the handle 2 and clamped in position upon the flared base of the handle, either by its own resiliency or by some special form of clamping means. This sleeve 3 may be conveniently formed from a single piece of sheet material which has the sides thereof bent around the edges of the handle and overlapped under the handle, as indicated at 3ª. The top of the sleeve 3 is provided at the flared end thereof with a clearance notch 4 for the cover engaging clip 5, and has tongues stamped therefrom and rolled upwardly to provide a pair of spaced and transversely alined bearing sleeves 6. The rear end of the sleeve is formed with an integral extension which is bent downwardly to provide a perforated guide ear 7.

A looped wire 8 extends transversely under the sleeve 3, the ends of the wire being extended inwardly from the top of the sleeve and providing, in effect, rock shafts 8ª which are journaled within the sleeves 6. The extremities of the looped wire, at the inner ends of the rock shaft elements 8ª, are bent laterally at 8ᵇ and rigidly secured to the base of the cover engaging clip 5. In the present instance the extremities of the wire are inserted through openings in the clip and doubled upon themselves, at 8ᶜ to grip the clip. The midle portion of the looped wire 8, under the sleeve 3, is crimped at 8ᵈ to provide a crank arm which is engaged by an operating plunger 9.

The cover 20 may be of any conventional type, being shown as having a dished formation, and as provided at the periphery thereof with a rib 20ª. The cover engaging clip 5 is shown as formed from a piece of resilient sheet metal, the edge thereof being slit to provide an intermediate gripping arm 11 and side gripping arms 12. These gripping arms have a resilient action and are shaped to engage the side of the cover 20, the bases of the gripping arms 12 being crimped at 12ª to interlock with the rib 20ª of the cover and prevent accidental disengagement of the cover from the cover engaging clip. It will be obvious, however, that the cover can be forcibly applied to the clip or removed therefrom, thereby enabling the cover to be detached for the purpose of cleansing the same, or when it may not be desired to use a cover.

The operating plunger 9 passes slidably through the perforated guide ear 7, and is connected to the crimped portion 8$^d$ of the looped wire 8 so that by sliding the plunger inwardly the looped wire will be swung upon the rock shaft elements 8$^a$ as a pivot and the cover 20 lifted into an open position. This operating plunger 9 is preferably constructed in such a manner as to engage the sides of the opening in the guide ear 7 and lock the cover in an open position when this is desired. As illustrated, the plunger 9 has a bifurcated formation and includes spring arms one of which is notched at 10 for engagement with the edges of the opening in the guide ear. Enlarged finger pieces 21 are provided at the outer ends of the spring arms of the plunger, and the teeth 10 are inclined, so that when the plunger is pushed inwardly to lift the cover 20 they will slide over the edges of the opening in the guide ear, although the said edges of the opening will be engaged by the square ends of the teeth to lock the cover in an open position. When it is desired to lower the cover 20 it is merely necessary to press the bifurcated arms of the plunger 9 toward each other and thereby disengage the notches 10 from engagement with the edges of the opening in the guide ear, whereupon the plunger will move rearwardly through the guide ear and permit the cover to drop back to a closed position.

Having thus described the invention, what I claim as new and desire to secure by Letters Patent, is:—

1. A cover operating attachment for frying pans, including a sleeve adapted to be fitted upon the frying pan handle, said sleeve being provided at the top thereof with a bearing and at the bottom with a downwardly extending guide ear, a looped wire extending under the sleeve and having one end thereof projected transversely over the top of the sleeve and journaled within the bearing, the extremity of the said end of the looped wire being bent laterally, a cover engaging clip rigid with the said laterally bent extremity of the wire, and an operating plunger arranged under the sleeve, said plunger being connected to the looped wire and passing slidably through the guide ear.

2. A cover operating attachment for frying pans, including a sleeve adapted to be fitted upon the frying pan handle, the top of the sleeve being provided with transversely alined spaced bearing sleeves, while the bottom of the sleeve is provided with a guide ear, a wire looped around the bottom of the sleeve and having the ends thereof extended inwardly from the top of the sleeve in alinement with each other and journaled within the bearing sleeves, the extremities of the wire being bent laterally, a cover engaging clip rigidly engaged by the said laterally bent extremities of the wire, and an operating plunger connected to the looped lower portion of the wire and extending slidably through the guide ear.

3. A cover operating attachment for frying pans, including a sleeve adapted to be fitted upon the frying pan handle, said sleeve being provided at the top thereof with transversely alined spaced bearing sleeves and at the bottom thereof with a guide ear, a wire looped around the bottom of the sleeve and having the ends thereof extended inwardly over the top of the sleeve in alinement with each other and journaled within the bearing sleeves, a cover engaging clip rigid with the ends of the looped wire, and an operating plunger connected to the lower portion of the wire and passing slidably through the guide ear, said plunger being bifurcated and the arms of the bifurcation having a resilient action and one thereof being notched for engagement with the edges of the opening in the guide ear to lock the plunger in operative position.

4. A cover operating attachment for frying pans, including a sleeve adapted to be fitted upon the frying pan handle, said sleeve being provided at the top thereof with transversely alined spaced bearing sleeves and at the bottom thereof with a downwardly extending perforated guide ear, a wire looped around the bottom of the sleeve and having the ends thereof extended inwardly over the top of the sleeve in alinement with each other and journaled within the bearing sleeves, the looped portion of the wire being crimped downwardly to provide a crank arm, while the extremities of the wire are extended laterally, a cover engaging clip rigidly applied to the laterally extended ends of the wire, and an operating plunger connected to the crimped portion of the looped wire and passing slidably through the guide ear, said operating plunger being formed with a resilient notched arm arranged for engagement with the edges of the perforation of the guide ear to lock the plunger in operative position.

In testimony whereof I have signed my name to this specification in the presence of two subscribing witnesses.

THOMAS H. JORDAN.

Witnesses:
H. E. JACKSON,
C. L. HARSHBARGER.

Copies of this patent may be obtained for five cents each, by addressing the "Commissioner of Patents, Washington, D. C."